United States Patent [19]

Kauffman et al.

[11] Patent Number: 5,349,481
[45] Date of Patent: Sep. 20, 1994

[54] APPARATUS AND METHOD FOR DISTORTED TRACK DATA RECOVERY BY REWINDING AND RE-READING THE TAPE AT A SLOWER THAN NOMINAL SPEED

[75] Inventors: Gerald C. Kauffman, Longmont; Timothy C. Hughes; Don Heins, both of Boulder; Patricia Slovacek, Louisville; Fadi Abou-Jaoude, Westminster, all of Colo.

[73] Assignee: Exabyte Corporation, Boulder, Colo.

[21] Appl. No.: 74,671

[22] Filed: Jun. 10, 1993

[51] Int. Cl.⁵ ............... G11B 15/48; G11B 5/09; G11B 15/467; G11B 5/584
[52] U.S. Cl. .................. 360/74.4; 360/73.06; 360/53; 360/77.13
[58] Field of Search ......... 360/53, 73.01, 73.04–73.06, 360/74.1, 74.4, 70, 77.01, 77.12, 77.13, 72.1

[56] References Cited

U.S. PATENT DOCUMENTS

| | | |
|---|---|---|
| 4,099,211 | 6/1978 | Hathaway . |
| 4,106,065 | 8/1978 | Ravizza . |
| 4,172,265 | 10/1979 | Sakamoto et al. . |
| 4,404,605 | 9/1983 | Sakamoto . |
| 4,420,778 | 12/1983 | Sakamoto . |
| 4,486,796 | 12/1984 | Sakamoto . |
| 4,821,129 | 4/1989 | Culp ........................... 360/74.4 |
| 4,843,495 | 6/1989 | Georgis et al. .............. 360/77.15 |
| 4,835,628 | 5/1989 | Hinz et al. ....................... 360/48 |
| 4,845,577 | 6/1989 | Georgis et al. . |
| 5,050,108 | 9/1991 | Georgis et al. ............. 360/77.16 |
| 5,251,077 | 10/1993 | Saitoh ............................ 360/53 |

OTHER PUBLICATIONS

NT . . . Stamp-sized DATs publication, pp. 1-22+-specs.

Primary Examiner—W. R. Young
Assistant Examiner—James L. Habermehl
Attorney, Agent, or Firm—Nixon & Vanderhye

[57] ABSTRACT

A helical drive system (10) reads tracks (18) on a storage medium (12), including tracks which appear as distorted tracks. Each track (18) comprises a plurality of blocks of data, with each block having unique block-identifying information. A read head (16C) traverses predetermined original azimuthal paths (P0) across the storage medium (12) for reading the blocks recorded along each of the original azimuthal paths (P0). A controller (50) uses the block-identifying information to determine whether any blocks expected to be read during the traversal of the original azimuthal paths (P0) were not read. If expected blocks were not read, the controller (50) rewinds or otherwise reverses the direction of travel of the storage medium (12); sends a signal to a tape transport drive (81) to slow the speed of the medium (12); and, directs that the medium (12) be re-read at a slower tape reread speed. During the slow re-read attempt, the read head (16C) traverses modified azimuthal paths (P1, P2, P3, . . . P10) which are separated from one another by a distance less than the track pitch, thereby providing opportunities to read blocks which would not otherwise be read due to distortion of the tracks (18).

20 Claims, 9 Drawing Sheets

APPARATUS AND METHOD FOR DISTORTED TRACK DATA RECOVERY BY REWINDING AND RE-READING THE TAPE AT A SLOWER THAN NOMINAL SPEED

BACKGROUND

1. Field of Invention

This invention pertains to apparatus and method for reading helically recorded magnetic tape, and particularly to apparatus and method for recovery from errors that occur when reading helically recorded magnetic tape having distorted tracks.

2. Related Art and Other Considerations

In accordance with helical scan recording technology, magnetically reproducible signals are recorded on magnetic storage media in the form of parallel tracks or stripes. It is well known that operational problems may cause one or more tracks of information, helically recorded on magnetic tape storage media, to appear upon playback or reading as a distorted track.

One type of distorted track is a curved track. In this respect, problems such as those associated with the handling or guiding of a magnetic tape as it is being read may cause a track to appear as a curved track.

Various prior art schemes have been developed to compensate for the reading of curved tracks. These schemes primarily enable a track-reading head or transducer to follow the curvature of the track. Typically this is done by mounting the track-reading head upon an element (such as a bi-morph leaf) that can be deflected to permit the head to follow the curved track.

The prior art schemes described above generally require that the track be formatted upon recording to include not only the stored data information, but also a special tracking or servo signal which must be continuously or periodically recorded along the length of the track. One examples of such a scheme is illustrated in U.S. Pat. No. 5,068,757 to Hughes et al. (incorporated herein by reference), which describes a servo technique utilized by an EXB-8200 helical tape drive manufactured by Exabyte Corporation. Other examples include U.S. Pat. Nos. 4,486,796 to Sakamoto; 4,420,778 to Sakamoto; 4,404,605 to Sakamoto; 4,172,265 to Sakamoto et al.; 4,099,211 to Hathaway; and, 4,106,065 to Ravizza.

Not all helical scan recording systems provide a continuous or periodic tracking or servo signal along the length of a track. For example, U.S. Pat. No. 4,843,495 to Georgis et al. (entitled CYCLICAL SERVO ZONE TRACKING METHOD AND APPARATUS FOR HELICAL SCAN RECORDING DEVICES), commonly assigned herewith and incorporated by reference herein, describes a servo technique implemented on an EXB-8200 helical tape drive manufactured by Exabyte Corporation. That servo technique involves the recording of a servo signal essentially only at the beginning of each track. Accordingly, the prior art schemes for attempting to read curved tracks are not suitable for this particular servo technique, or any technique (such as the Sony NT format) which does not employ servo signals at all.

Downtrack from the servo signal area, both the prior art EXB-8200 helical tape drive and the prior art EXB-8500 helical tape drive record informational data in a blocked format, with eight data blocks being recorded per track or stripe. As explained in U.S. patent application Ser. No. 07/069,132 filed Jul. 2, 1987, now abandoned, entitled METHOD AND APPARATUS FOR DATA BUFFER MANAGEMENT, commonly assigned herewith and incorporated herein by reference, the magnetic tape is formatted so that every data block has a header portion that includes block-identifying information. Upon reading of a block, a micro-controller stores the data contents of the block in a data buffer and the block-identifying information into an allocation table. Using the block-identifying information stored in the allocation table, the micro-controller ascertains the order for utilizing the corresponding data blocks stored in the data buffer.

If a search of the allocation table of the EXB-8200 indicates that a block is missing, as might occur during a curved track read condition, the micro-controller would request re-reading of the tape in hopes that the missing block would be detected and read upon re-read. However, during re-read the read head would follow essentially the same path as during the initial read, with the result that a block on a curved track that evaded discovery during an initial read attempt could also be evasive during subsequent read attempts.

U.S. Pat. No. 5,050,018 to Georgis et al. (incorporated herein by reference) teaches a re-reading of tape with distorted tracks in a manner whereby the read head is positionally offset from its original azimuthal paths so as to follow modified azimuthal paths at nominal tape speed. The tape is repeatedly re-wound, if necessary, with a different modified azimuthal path being followed after each rewind, until all blocks have been read. However, under some circumstances, repeated re-winding of the tape medium can exacerbate track distortion and can be deleterious to the tape medium.

Sony Corporation has introduced an "NT" format wherein read heads travel, at greater than a nominal recording speed, over tracks without necessarily passing over the track centerlines, and thus not necessarily reading the blocks in the order in which they were written. By using block identification information embedded in each block of the track, an apparatus using the NT format places the read blocks in an intelligible order for utilization.

In addition to curved tracks, other types of distortions to the ideal track geometry may be present when a tape is read. These distortions may be the result of the data write operation, the read operation, or both. Some examples of these distortions are listed below:

(a) Track pitch distortions caused during the recording process by fluctuating tape speed or abnormal splice operations.

(b) Track angle variations caused by tape guide misalignment or by the use of tape having worn or damaged edges. This could effect both the data write and read operations.

(c) Interchange between two data recorders having incompatible tape guide adjustments. This could result in combinations of track angle and track curvature problems during the data read process.

(d) Other types of distortion could result from contaminants becoming deposited on the tape after the data was recorded. The presence of the contaminant could alter the way in which the read head follows the recorded track.

Accordingly, it is an object of the present invention to provide method and apparatus for reading helically recorded tracks, even when the tracks are distorted.

An advantage of the present invention is the provision of method and apparatus that facilitates the reading of distorted tracks, such as curved tracks, when tracking or servo information is not provided continuously or periodically along the tracks.

SUMMARY

A helical drive system according to the present invention reads tracks recorded on a storage medium, including tracks which appear as distorted tracks. Each track comprises a plurality of blocks of recorded data, with each block having unique block-identifying information provided in a block header.

The drive system includes a read head positioned on a rotatable drum which contacts the storage medium in such a manner that the read head traverses predetermined original azimuthal paths across the storage medium for reading blocks recorded along each of the original azimuthal paths. The original azimuthal paths are straight paths.

As each block is read, the block-identifying information is stripped from the block header. Non-header portions of the block, known as block "user data" or the "user block" are stored in a data buffer. The block-identifying information for each user block loaded into the data buffer is stored in an allocation table. One of such block-identifying parameters is known as BLOCK ID. The allocation table thereby essentially serves as a directory for listing the BLOCK IDs for the user blocks stored in the data buffer.

Blocks stored in the data buffer are made available to a user or utilization device, such as a host computer system. The utilization device requests additional blocks from the data buffer as needed, and expects to receive the blocks in predetermined order according to a monotonic increasing series of BLOCK ID values. When a request is received from the utilization device, a controller included in the helical drive system determines, by consulting the allocation table, whether a block having the next BLOCK ID is stored in the data buffer. If the sought BLOCK ID value is located in the allocation table, the corresponding block is transmitted from the data buffer to the utilization device.

If the sought BLOCK ID value is not located in the allocation table, the controller executes a loop known as the RE-READ LOOP. In one mode of operation, known as the rewind re-read mode, during execution of the RE-READ LOOP, the controller repositions (e.g., rewinds) the storage medium. The controller then sends a signal to a tape transport drive to slow the speed of the medium and directs that the re-wound medium be re-read at a slower tape re-read speed. During the re-read attempt, the read head traverses modified azimuthal paths which are separated from one another by a distance less than the track pitch, thereby providing opportunities to read blocks which would not otherwise be read due to distortion of the tracks.

In another mode of operation, known as the reverse re-read mode, during execution of the RE-READ LOOP, the controller reverses the direction of tape transport and directs that the medium be re-read at a slower tape speed as the medium travels in the reverse direction. During the re-read attempt, as the tape travels in the reverse direction, the read head traverses modified azimuthal paths which are separated from one another by a distance less than the track pitch, thereby providing opportunities to read blocks which would not otherwise be read due to distortion of the tracks.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
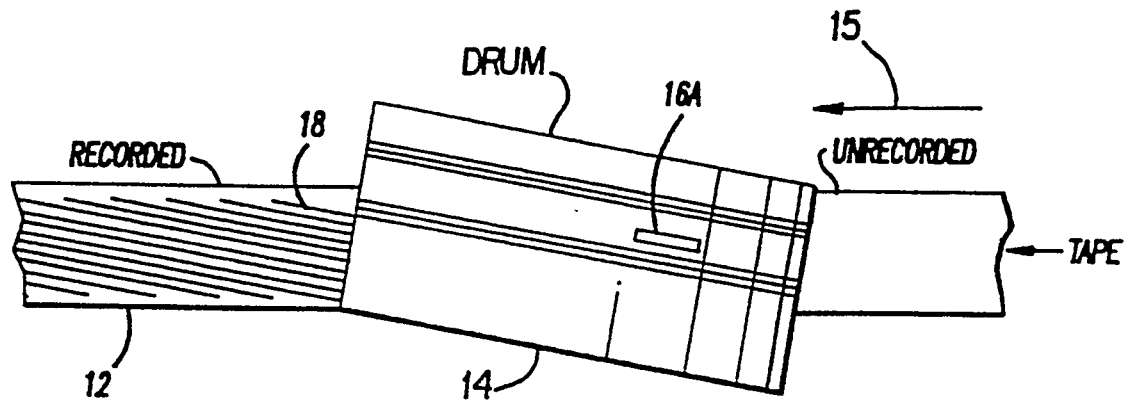
FIG. 1 is a schematic illustration of recording on magnetic tape by tracks using a helical scan recording arrangement.
Figure 2:
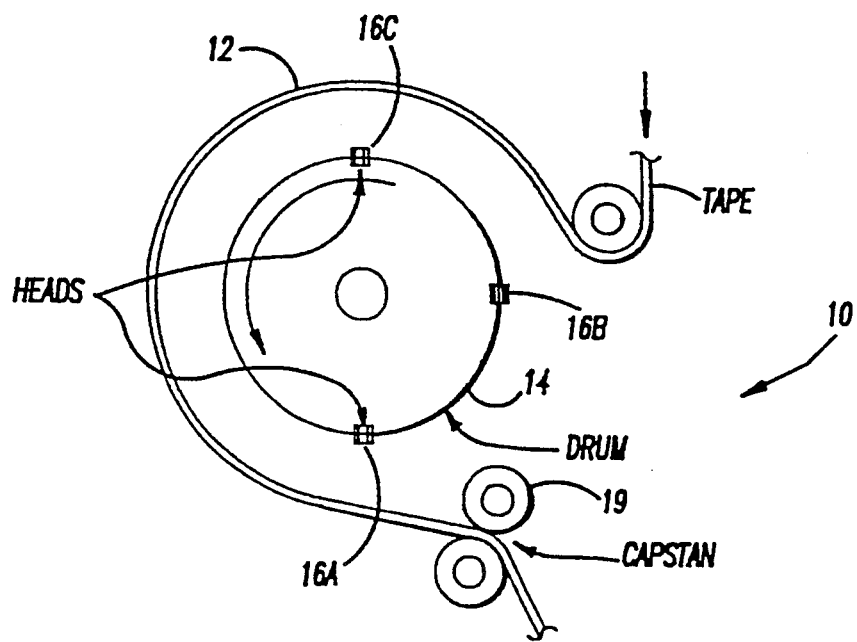
FIG. 2 is a schematic illustration of magnetic head placement on a rotatable drum for helical scan recording on magnetic tape according to an embodiment of the invention.

A helical-scan drive system 10 for recording on and reading magnetic tape 12 is illustrated in FIGS. 1 and 2. A drum 14 is angularly oriented with respect to the edges and direction of travel 15 of magnetic tape 12. As indicated in FIG. 2, drum 14 has heads 16A, 16B, and 16C mounted thereon to establish a physical relation between the heads on the drum 14 and the tape 12. Head 16A is a write (or recording head); head 16B is a servo head; and, head 16C is a read (or playback) head. The servo head 16B is pictured in the illustrated embodiment in view of its common use in helical-scan drive systems. However, the servo head 16B is not employed in the data recovery method of the present invention.

By the illustrated arrangement, data is recorded on the tape 12 at an angle with respect to the direction of travel 15 of the tape 12, and hence, as indicated in FIG. 1, is recorded as discrete tracks or stripes 18 when the drum is rotated at a high speed relative to the speed of the tape 12. As indicated in FIG. 2, the tape is preferably moved at a predetermined nominal rate (for example, 10.89 millimeters per second in one embodiment) while the drum is rotated (for example, at 1800 rpm in one embodiment). The tape speed is controlled by the rotational speed of capstan 19. It is to be realized, however, that the operating speeds as set forth are by way of example and the invention is not meant to be limited thereto.

Figure 3:
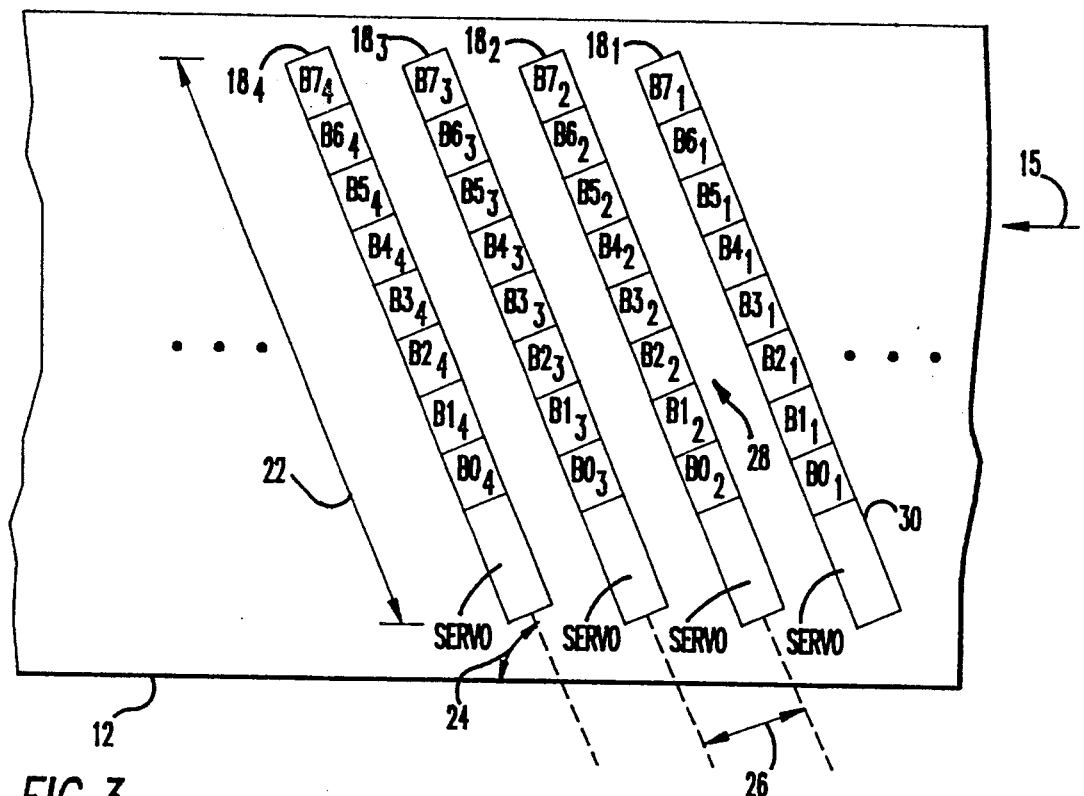
FIG. 3 is a schematic illustration of helical tracks properly recorded on magnetic tape, and a particular format thereof.

FIG. 3 shows a plurality of discrete tracks $18_1$, $18_2$, $18_3$, and $18_4$ properly recorded on tape 15 according to one embodiment of the invention. Being properly recorded, each of the tracks 18 extends in a straight line for a predetermined length (depicted by line 22) at an angle 24 (also known as a "track angle" or "stripe angle") relative to the direction of tape travel (indicated by arrow 15). The centerlines of adjacent tracks are separated by a track pitch, represented by reference numeral 26 in FIG. 3.

In the illustrated embodiment, the tracks are separated by inter-track guard bands 28. In the illustrated embodiment, the a angle 24 is on the order of 4.9 degrees; the track pitch is on the order of 31 micrometers It should be understood, however, that the present invention is also utilizable with track formats which do not employ inter-track guard bands, including a dual channel format disclosed in U.S. Pat. No. 5,142,422 to Zook et al (commonly assigned herewith and incorporated herein by reference).

FIG. 3 also shows a format of tape 12 usable with the present invention. The tape 12 is block oriented, with eight data blocks $B0_x$, $B2_x$, ... $B7_x$ being provided per track 18, tracks x=1, 2, ... 4 being shown in FIG. 3 as previously stated. Each block is a complete and independent entity which can be read independently of any other data blocks. For an example of the format of each data block, see U.S. Pat. No. 4,835,628 to Hinz et al. entitled APPARATUS AND METHOD FOR FORMATTING AND RECORDING DIGITAL DATA ON MAGNETIC TAPE, which is commonly assigned herewith and incorporated by reference herein.

With regard to format, each data block contains certain header information, including a BLOCK ID and PHYSICAL BLOCK ID, the combination of which is unique for each block. As used hereinafter, "user data" and "user block" refer to the non-header portion of each block which is ultimately transmitted to a utilization device, such as a host computer.

In addition to containing the eight data blocks, in the illustrated embodiment each track 18 contains near its beginning (i.e., before the data blocks) a servo area 30. The servo area 30 has stored therein signals readable by the servo head 16B and usable for positioning the heads 16A, 16B, and 16C on the drum 14 relative to the tape 12. A particular servo scheme and format usable in conjunction with the illustrated embodiment of the present invention is shown in U.S. Pat. No. 4,843,495, previously incorporated by reference herein. In accordance with the illustrated servo scheme, the servo data in the servo area 30 is recorded only at the beginning of a track 18 and is sampled only once per revolution of the heads 16. Although FIG. 3 and various other drawings show the servo area 30 at the beginning of each track, it should be understood that the present invention is usable also with tracks having servo zones recorded at other locations, or even with tracks having no servo zones at all.

The helical-scan systems of the present invention advantageously read distorted tracks. A "distorted track" or "distorted stripe" as used herein means a track that deviates from any one or more of the following nominal, predetermined parameters: track pitch; track angle; track length; and track straightness. As indicated above, various types of problems may cause track distortion. One type of example is a mechanical tape guiding problem which may cause the tape to establish an alignment which is different from the proper alignment of FIG. 3. This other or different alignment may achieve an equilibrium and persist until some change in the tape motion or external forces act on the tape to restore the tape to its desired alignment.

Figure 5:
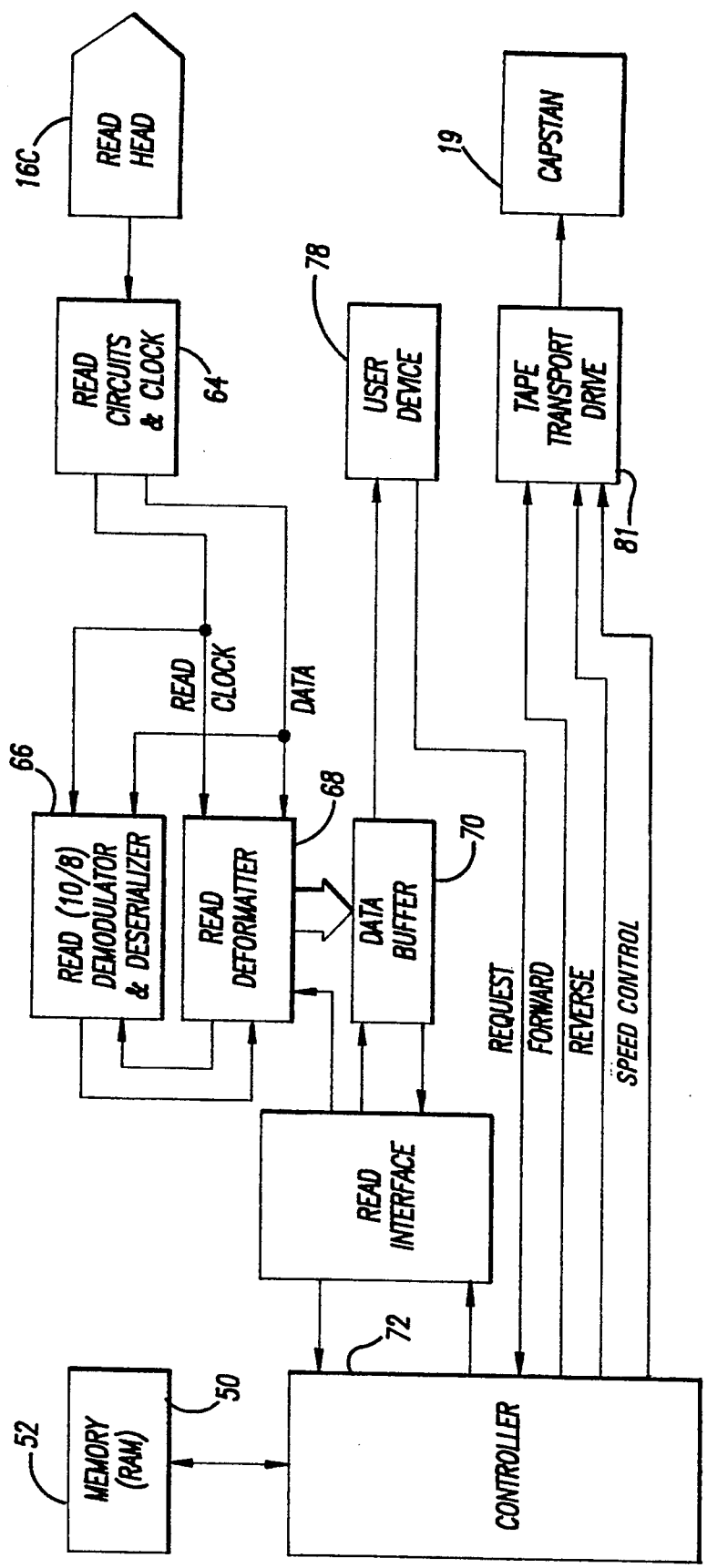
FIG. 5 is a schematic illustration of circuitry included in a helical scan drive system according to an embodiment of the invention.

In addition to the aforementioned elements, and as shown in FIG. 5, the helical drive system 10 of the invention further includes a controller 50, such as a micro-processor based micro-controller, for example. The controller 50 is connected to a bank of RAM memory 52 in conventional fashion. As will be seen hereinafter, an allocation table is stored in the RAM memory 52. The read head 16C is connected to apply signals read from the tape 12 to read circuits & clock 64 (See FIG. 5). Data to be read is received at the read circuits 64 and, together with a clock signal, is coupled to a read demodulator and deserializer 66 and to a read deformatter 68. In the read deformatter 66, certain header and referencing signals are removed from the data stream so that the recovered user data can be applied in block form to a data buffer 70. The operations of the data buffer 70 and the read deformatter 68 are managed by a read interface 72, which in turn is governed by the controller 50. Details of the structure and operation of the circuitry of FIG. 5 are understood from U.S. Pat. No. 4,835,628, already incorporated by reference.

FIG. 5 additionally shows a user device 78 such as a host computer and an associated interface. The user device 78 is connected to request user data from the controller 50 and to receive user blocks from the data buffer 70.

Figure 6:
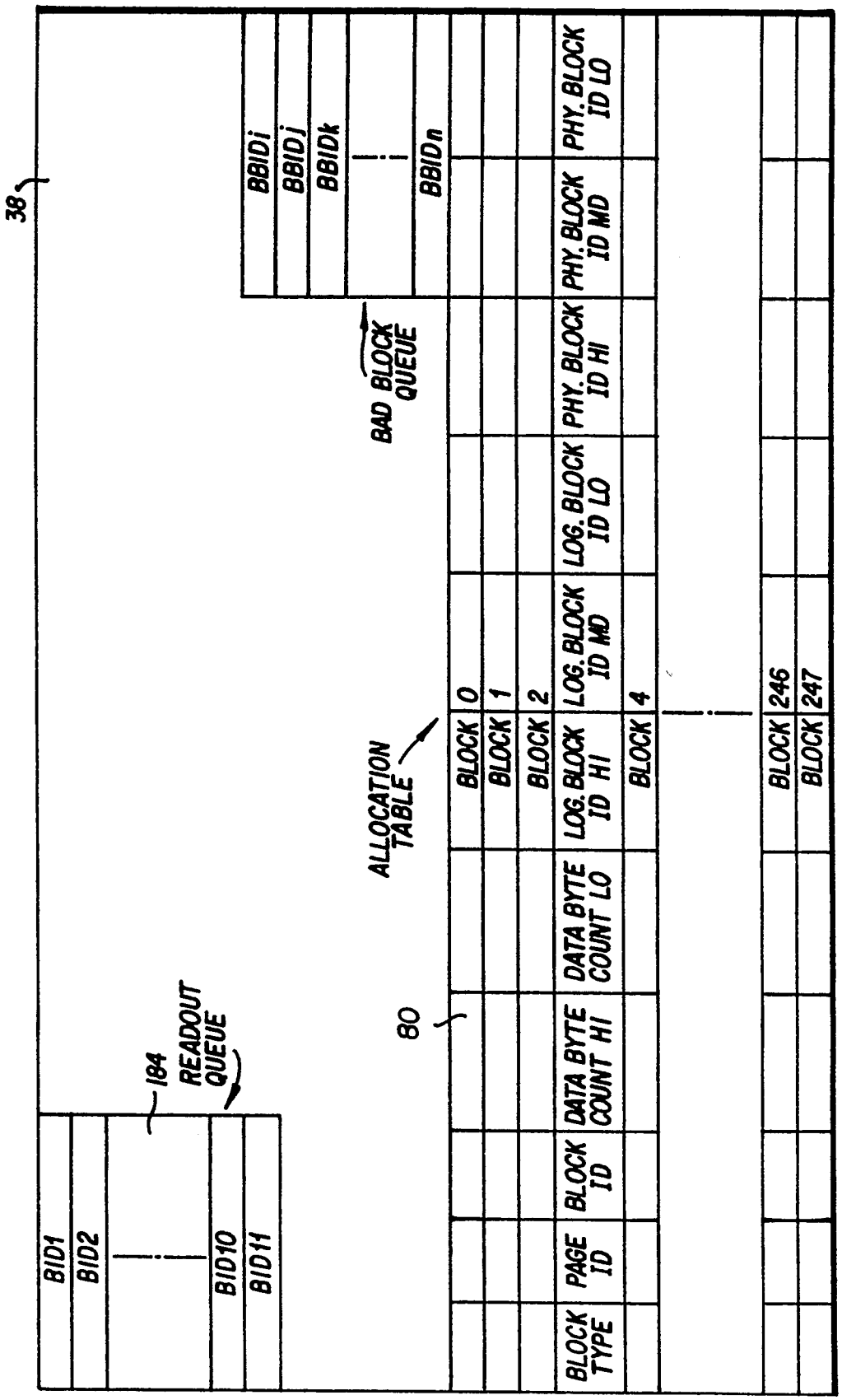
FIG. 6 is a schematic illustration depicting a portion of a controller memory including an allocation table according to an embodiment of the invention.

FIG. 6 schematically illustrates portions of the RAM memory 52 associated with the controller 50. The RAM memory 52 includes an allocation table 80. The allocation table 80 has stored therein certain parameters for as many as 248 blocks, shown as blocks 0–247 in FIG. 6. In FIG. 6, each block corresponds to a row of the allocation table 80. The parameters stored in the allocation table 80 for each block include block header information, including the BLOCK ID and PHYSICAL BLOCK ID parameters which are unique to each block.

Figure 7:
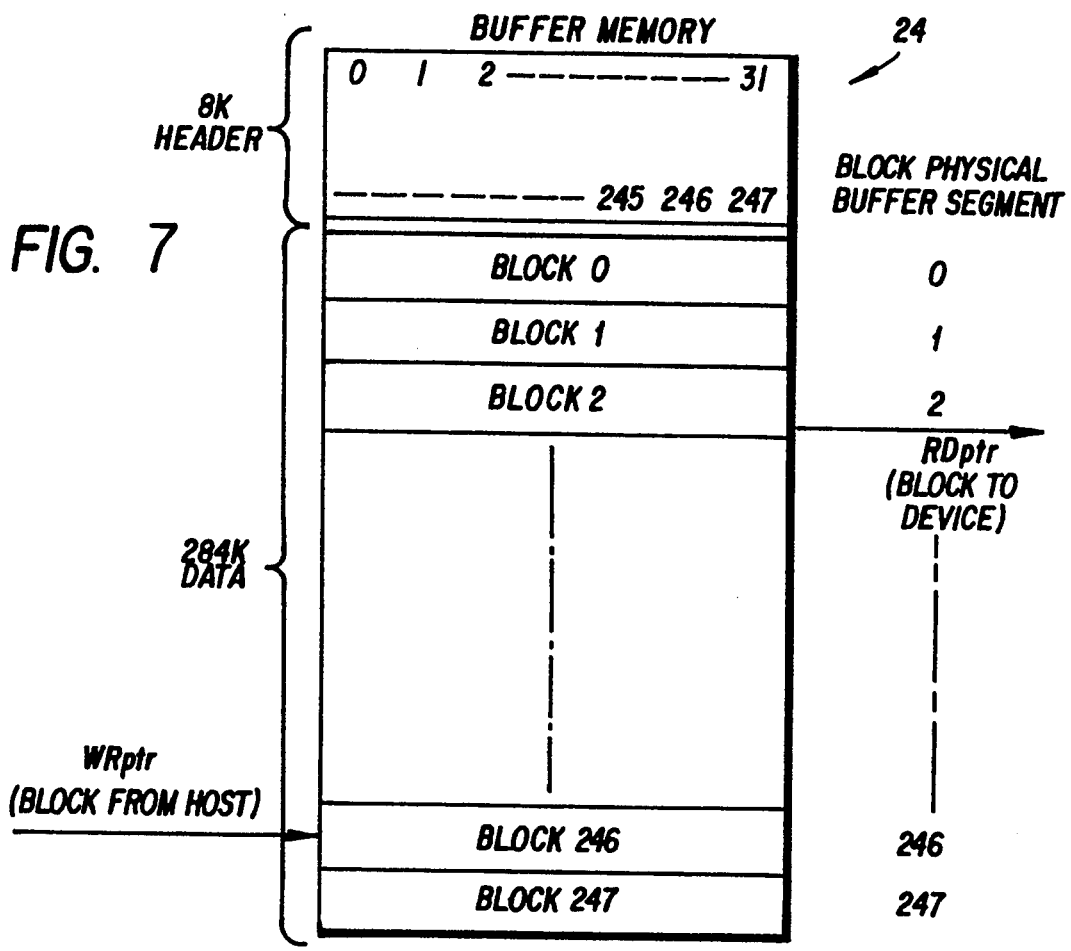
FIG. 7 is a schematic illustration depicting a memory organization scheme for a data buffer according to an embodiment of the invention.

FIG. 7 is a schematic view of the memory organization scheme of the data buffer 70. As shown in FIG. 7, the data buffer 70 includes 248K of memory for storing 248 blocks of user data, with each user block having a length of 1K. As will be seen hereinafter, when a user block of data is recognized by the read deformatter 68, the entire user block is transmitted to the data buffer 70 where the user block is stored at an appropriate address in the data buffer memory.

The controller 50 is connected to a tape transport drive 81 to direct the transport drive 81. The controller 50 provides both directional signals and a SPEED CONTROL signal to the transport drive 81. The directional signals include a FORWARD signal (for moving the tape in a forward direction [indicated by arrow 15]) and a REVERSE SIGNAL (e.g., for moving the tape in a reverse direction [opposite the direction indicated by arrow 15]). The transport drive actuates the capstan 19. 25 In some embodiments, as understood with reference to U.S. Pat. No. 5,050,018 to Georgis et al., the controller 50 can also be connected to a servo interface which applies a tracking control signal to a servo head positioning mechanism. However, since these elements are not utilized by the present invention, they are not illustrated or discussed herein.

OPERATION

In normal operation, the drum 14 rotates as the magnetic tape 12 travels therepast. The magnetic tape 12, driven by capstan 19, travels at a nominal tape speed. In this regard, the controller 50 outputs to the tape transport drive 81 a SPEED CONTROL signal having a value indicative of the nominal tape speed.

Upon each rotation of the drum 14, when the read head 16C is in contact with the tape 12, the read head 16C traverses a predetermined azimuthal path across the magnetic tape 12 in the manner shown by FIG. 1. Assuming the read head 16C is correctly aligned with tracks that are properly readable as straight tracks, upon each rotation of the drum 14 the read head 16C acquires signals from eight blocks B0, B1, . . . B7 as described hereinbefore.

The signals from the eight blocks acquired from the read head 16C are applied to the read circuits 64, and from thence to the read demodulator & deserializer 66 and to the read deformatter 68. The read deformatter 68 analyzes the signals obtained from the read head 16C and, by examining block header parameters exacted from the signals, determines the number of blocks that were in fact read from the track. The read deformatter 66 essentially strips the block header from each block, and for each block makes available to the read interface 72 certain block header parameters (including BLOCK ID and PHYSICAL BLOCK ID). Functioning in conjunction with the read interface 72, the controller 50 stores these block header parameters in the allocation table 80 of RAM 52 in the format shown in FIG. 6. Thus, at any given point in time, the allocation table 80 contains header data for every user block then stored in the data buffer 70.

Figure 8:
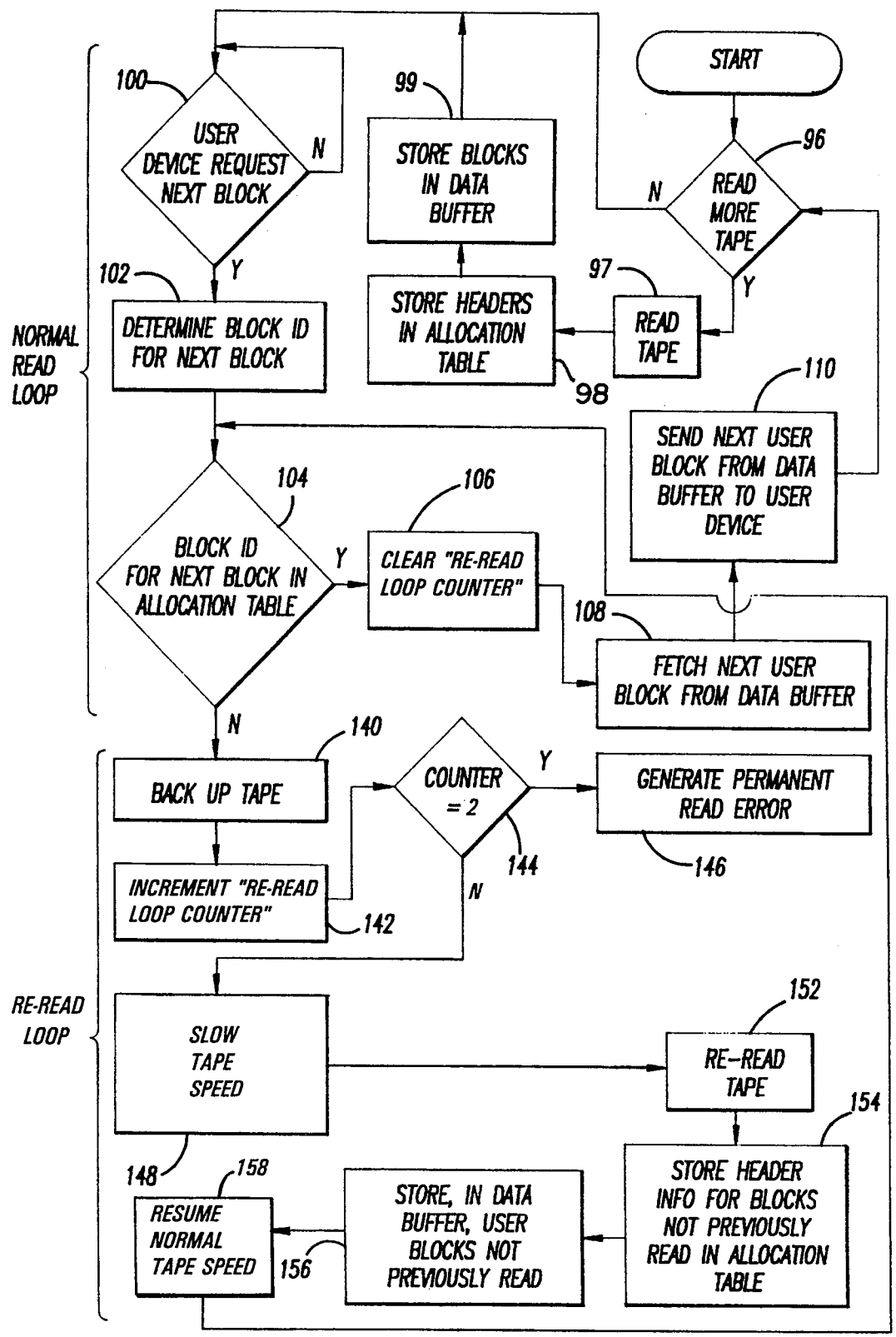
FIG. 8 is a schematic illustration of steps executed by a controller of the embodiment of FIG. 5, including steps executed according to a rewind re-read mode of the invention.
Figure 9:
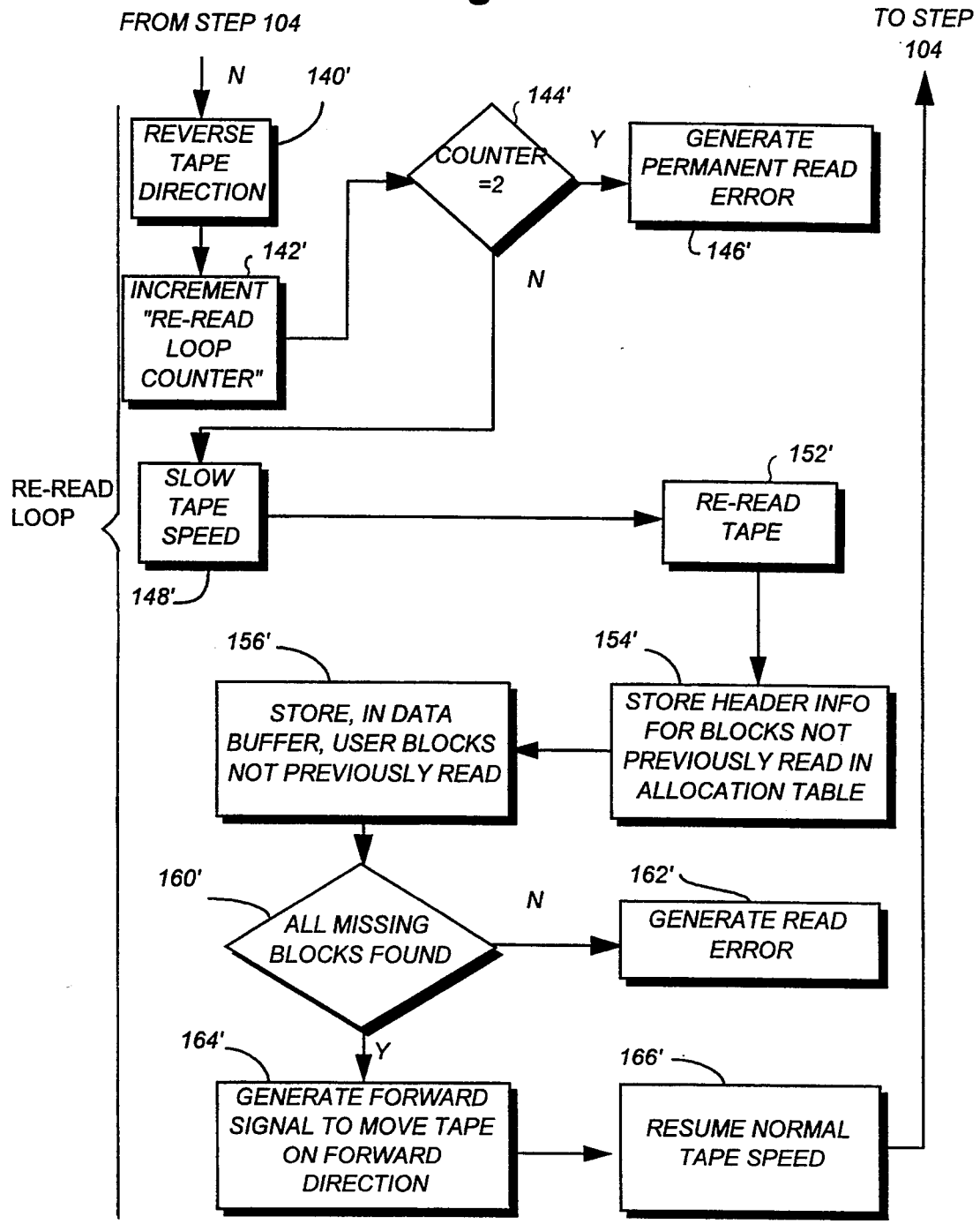
FIG. 9 is a schematic illustration of steps executed by a controller of the embodiment of FIG. 5 according to reverse re-read mode of the invention.

FIG. 8 is a flowchart illustrating steps executed by the controller 50 in connection with the reading operation of the drive system 10 of FIG. 5. The steps of FIG. 8 are grouped into two execution loops. A first execution loop, labeled the NORMAL READ LOOP, is repetitively executed as long as all the blocks which are expected to be read from tape are, in fact, read. During execution of the NORMAL READ LOOP, the tape 12 (as driven by capstan 19) travels at the nominal tape speed. A second execution loop, labeled the RE-READ LOOP, is executed whenever it is determined that one or more blocks have not been found on the tape, as might occur when reading distorted tracks, for example. The particular RE-READ LOOP shown in FIG. 8 is executed in a rewind re-read mode of operation. Another RE-READ LOOP shown in FIG. 9 is executed in a reverse re-read mode of operation.

At appropriate intervals the controller 50 determines that more tape should be read. This determination is represented by step 96. If additional tape is to be read, the tape is read as indicated by block 97. Upon reading of the tape, at step 98 header information from the blocks just read is stored into the next available locations in the allocation table 80 (see FIG. 6). At step 99, user data from the blocks just read is stored in the next available locations in the data buffer 70 (see FIG. 7).

As required, the user device 78 requests a next user block of information from the data buffer 70 by applying a request signal to the controller 50 (represented by step 100 of FIG. 8). Knowing the BLOCK ID for the block last sent to the user device 78, and knowing that the BLOCK IDs for successive blocks are in increasing monotonic sequence, at step 102 the controller 50 determines the value of BLOCK ID for the next requested block by incrementing the previous value of BLOCK ID.

Knowing now the value of BLOCK ID for the next requested user block, at step 104 the controller 50 checks the allocation table 82 to determine if the BLOCK ID for the next requested block is stored in the appropriate field in the allocation table 82. If the BLOCK ID for the next requested block is not stored in the allocation table 82, processing jumps to the RE-READ LOOP described below. Otherwise, the remainder of the NORMAL READ LOOP, comprising steps 106, 108, 110, and 96, and possibly steps 97, 98, and 99, is executed.

If the BLOCK ID for the next requested block is stored in the allocation table, at step 106 a counter denominated as RE-READ LOOP COUNTER is cleared (zeroed). Then, the user block having the next required BLOCK ID is obtained from the data buffer 70 (step 108) and sent to the user device 78 (step 110) in the manner specified in U.S. patent application Ser. No. 07/069,132 filed Jul. 2, 1987, now abandoned entitled METHOD AND APPARATUS FOR DATA BUFFER MANAGEMENT, commonly assigned herewith and incorporated herein by reference.

So long as the BLOCK IDs for requested blocks are stored in the allocation table 82, the loop entitled NORMAL READ LOOP is repetitively executed. That is, after the execution of step 110, processing ultimately loops back to step 100 so that the next BLOCK ID can be processed.

Figure 4:
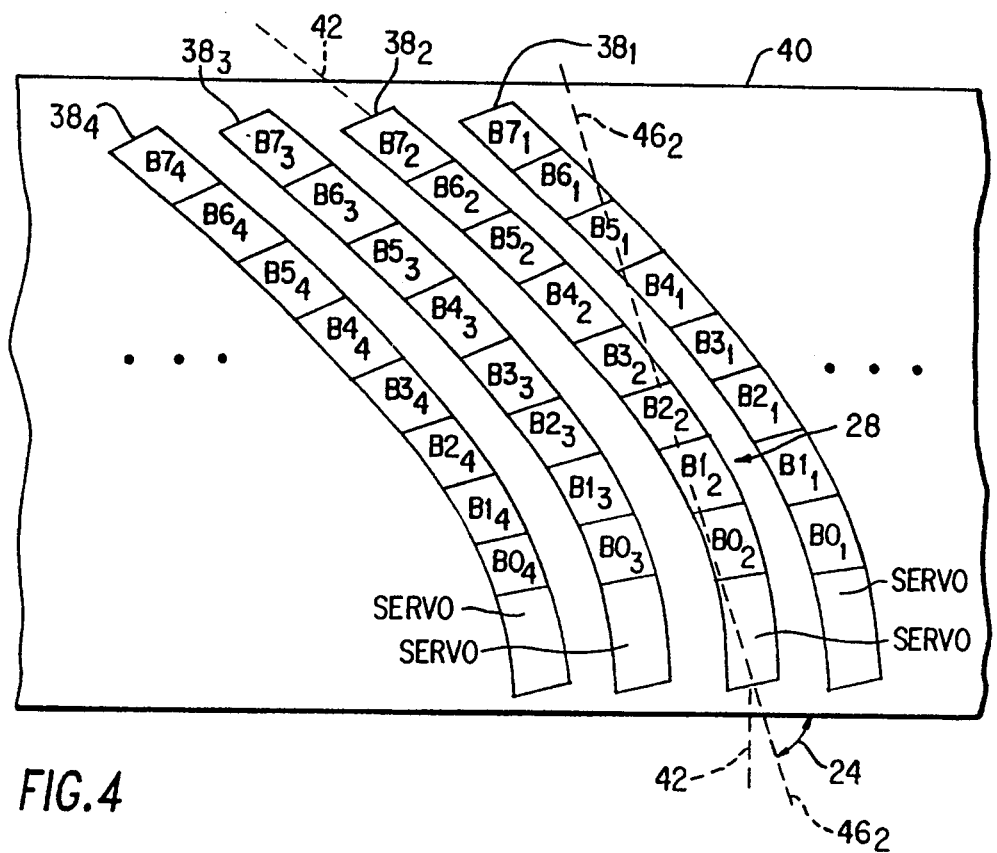
FIG. 4 is a schematic illustration of distorted tracks appearing on magnetic tape upon a tape read operation.
Figure 4A:
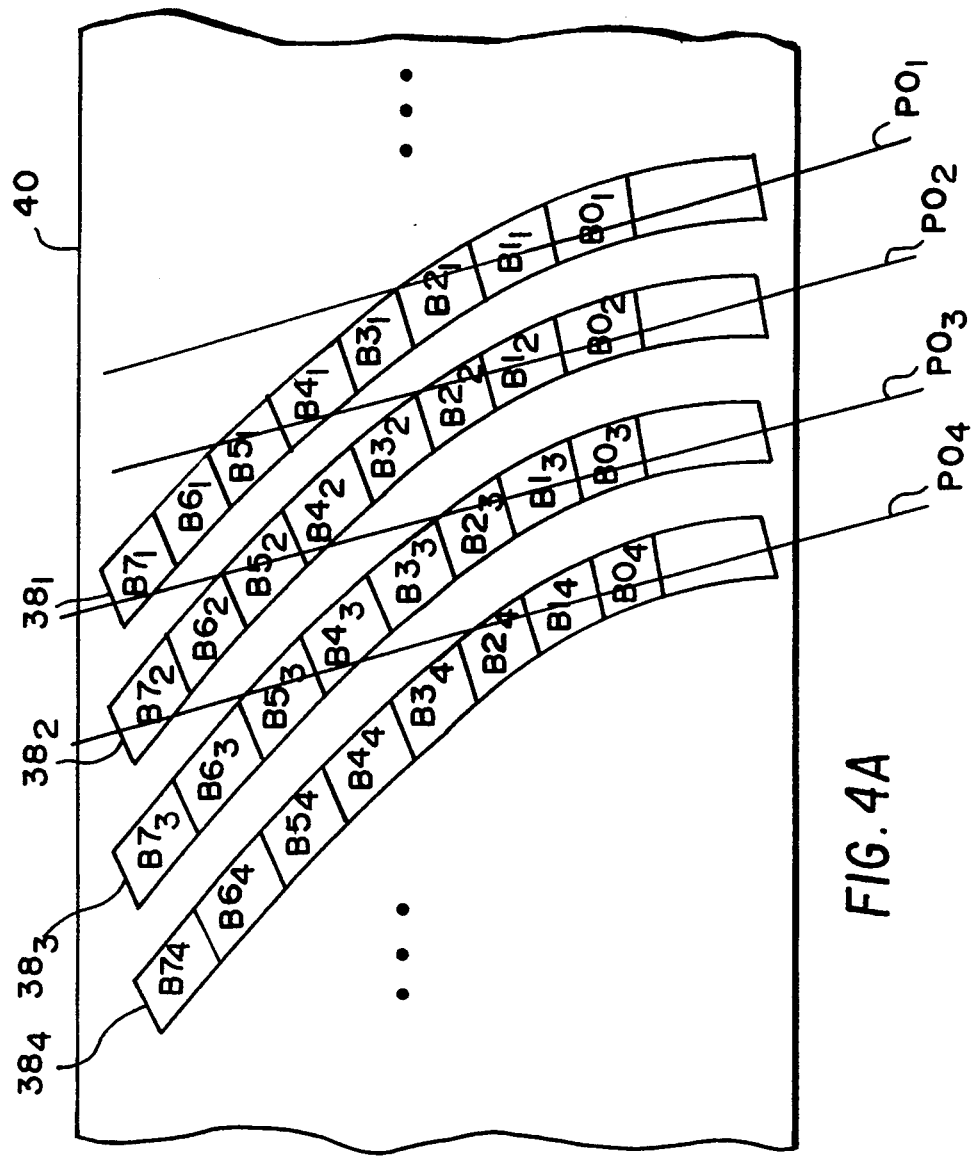
FIG. 4A is a schematic illustration showing original azimuthal paths across distorted tracks appearing on magnetic tape during a tape read operation.

The loop NORMAL READ LOOP is executed by the controller 50 as long as the user device 78 is requesting blocks whose BLOCK IDs are stored in the allocation table. But, if the tracks 38 are curvedly distorted as shown in FIG. 4A, for example, BLOCK IDs will not be present in the allocation table for all blocks. As shown in FIG. 4A, the read head 16C traverses the tape on original azimuthal paths $P0_1$, $P0_2$, $P0_3$, etc. In such instance, blocks not traversed by heads 16C, such as blocks $B3_1$, $B6_1$, $B3_2$, $B6_2$, for example, may not be read by the read head 16C, and thus would not have their BLOCK IDs entered into the allocation table.

When the user device 78 requests a next block, and the BLOCK ID for that block is not stored in the allocation table 80 (i.e., a "hole" for that block exists in the allocation table), processing jumps to a RE-READ LOOP, and particularly either to step 140 of FIG. 8 or to step 140' of FIG. 9. As described below, the purpose of each execution of the RE-READ LOOP is to provide the head 16C with another opportunity to read, while the tape travels at a slower than nominal speed, any blocks whose BLOCK ID values are missing from the allocation table 82.

Considering first the RE-READ LOOP of the rewind re-read mode as shown in FIG. 8, at step 140 the controller 50 applies a signal to the transport drive 81 so that the tape 12 is repositioned or rewound a fixed distance from the point at which the hole in the allocation table is discovered. The controller 50 is either programmed with a value indicative of this fixed rewind distance, or is programmed with data to calculate a value for this fixed rewind distance. In the illustrated embodiment, the fixed rewind distance is equal to the maximum distance that the missing block can be located from the present head position. This fixed rewind distance is calculated in dependence upon the particular block re-write criteria of the helical-scan system 10 (see, for example, U.S. patent application Ser. No. 07/069,132, now abandoned); upon the format of the tape; and upon the format of the data buffer 70.

The counter RE-READ LOOP COUNTER is incremented at step 142 to indicate that the RE-READ LOOP has been entered. Accordingly, during a first (and only permitted) execution of the RE-READ LOOP, the value of the RE-READ LOOP COUNTER is "1".

At step 144 the value of the RE-READ LOOP COUNTER is evaluated to determine whether the RE-READ LOOP exceeds 1. If RE-READ LOOP COUNTER exceeds 1, processing is terminated and a permanent read error is generated at step 146. Otherwise, processing continues at step 148.

At step 148, the controller 50 changes the value of the signal SPEED CONTROL applied to the tape transport drive 81 to reduce significantly the speed of travel of the tape past the head 16C during the subsequent re-read operation. In the illustrated embodiment, the speed of travel of the tape during execution of the RE-READ loop is in a range of between 1:3 to 1:10 of nominal speed and preferably is on the order of about 1:8 nominal speed.

With the speed of the tape 12 having been significantly slowed in the manner described above with reference to step 148, at step 152 the tape 15 is re-read in the manner illustrated with reference to FIG. 4B. The re-reading of the tape 12 as indicated by step 152 continues as long as necessary. The re-reading time may be predetermined or determined on the fly in accordance with BLOCK ID and related information available to the controller 50.

Figure 4B:
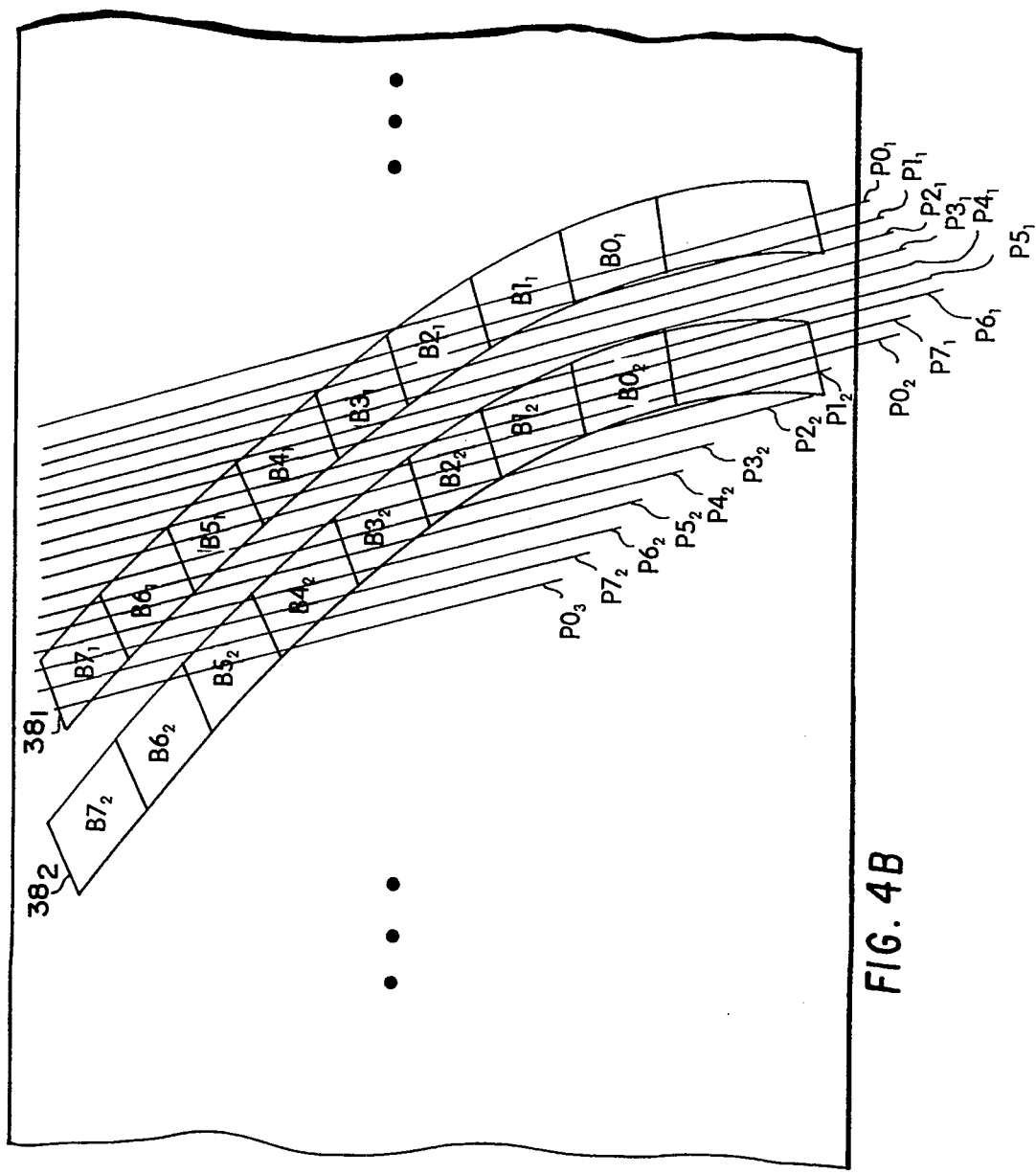
FIG. 4B is enlargement of a portion of the schematic illustration of FIG. 4A further showing modified azimuthal paths traversed during a tape slow read operation of the present invention.

FIG. 4B is an enlarged view of portion of FIG. 4A, and shows modified azimuthal paths $P1_1, P2_1, P3_1, P4_1, \ldots P7_1; P1_2, P2_2, \ldots P7_2$; etc., which the read head 16C will successively traverse during the re-read (in addition to the original azimuthal paths $P0_1, P0_2$, etc., assuming alignment with the original azimuthal paths upon re-read). Since during re-read, the speed of the tape 12 is ⅛ the nominal speed, the modified azimuthal paths are distanced apart to be ⅛ of the distance generally separating the tracks (i.e., ⅛ of the track pitch in the illustrated embodiment).

As the tape 12 is being re-read, at step 154 header information is stored in the allocation table 82 for any blocks read during the re-read of step 152, provided those blocks were not previously read. As evident from FIG. 4B, the read head 16C will traverse blocks whose headers were heretofore unreadable, such as blocks $B3_1$, $B6_1$, $B3_2$, $B6_2$, for example. Similarly, at step 156 the data buffer is loaded with the user data from blocks whose header information is stored in the allocation table 82 during the re-read operation of step 152.

After the completion of the re-read operation (e.g., steps 152, 154, and 156), at step 158 the controller 50 changes the value of the SPEED CONTROL signal applied to the tape transport drive 81, so that the nominal tape transport speed is resumed.

After execution of step 158, processing jumps back to step 104. At step 104, it is determined whether a block requested by the user device 78, but previously missing from the allocation table 82 and data buffer 70, can now be located in the allocation table 82 and the data buffer 70. If the determination is negative (i.e., the requested block still cannot be located), the RE-READ LOOP is again executed, but will be exited with a permanent read error at step 146 in the manner aforedescribed.

FIG. 9 illustrates a RE-READ LOOP for another mode of operation of the invention, known as the reverse re-read mode. It should be understood that steps in the NORMAL READ LOOP of FIG. 8, although unillustrated in FIG. 9, are applicable to the mode of FIG. 9.

At step 140' of FIG. 9, controller 50 generates a REVERSE signal to enable the tape transport 81 to move the tape in a reverse direction (i.e., the direction opposite arrow 15 [see FIG. 1]). At steps 142', 144', 148' and (optionally) 146', the controller 50 executes similar operations as described with reference to un-primed correspondingly number steps of FIG. 8. At step 148', the tape speed is slowed in the speed range and in the manner discussed with reference to FIG. 8.

At step 152', as a result of the values of the REVERSE and SPEED CONTROL signals set at steps 140' and 148', respectively, the tape is re-read in the manner illustrated with reference to FIG. 4B. In this reverse re-read mode, if a missing block were determined by the time the read head 16C traversed the path $P0_3$, the tape direction is reversed and the paths $P7_2$, $P6_2, P5_2, \ldots$ etc. are traversed (from beginning of stripe to end of stripe, e.g., from bottom of page to top of page) at the reduced speed of travel (e.g., for example, ⅛ nominal speed.

As understood with reference to the discussion of unprimed correspondingly numbered steps in FIG. 8, at steps 154' and 156' the controller 50 fills the buffer with blocks previously missing from the allocation table. If the missing block(s) are not found within a predetermined time period (as determined at step 160', at step 162' an error 10 message is generated.

When the missing block(s) are found, at step 164' controller 50 applies the FORWARD signal to transport 81, followed (at step 166') by application on line SPEED CONTROL of a value indicative of nominal tape speed (or possibly a faster than nominal speed). The signals applied at step 166' are applied for a predetermined time duration so that the tape transport 81 positions the read head 16C at the point wherefrom it departed at entry into the RE-READ LOOP. Thus, advantageously, the tape need be read in the reverse direction only until the missing blocks(s) are located.

Thus the invention advantageously provides method and apparatus for recovering data from distorted tracks without having to repeatedly re-wind the tape medium. Accordingly, the invention does not consume time with repeated re-wind operations. One re-read pass at ⅛ nominal speed takes the time of only 4 passes at nominal speed (including head repositions), with at least as good error recovery. Importantly, the invention does not require the use of servo techniques.

While the invention has been particularly shown and described with reference to the preferred embodiments thereof, it will be understood by those skilled in the art that various alterations in form and detail may be made therein without departing from the spirit and scope of the invention. For example, the ratio of slow tape speed to nominal tape speed can be other than ⅛, so long as it is significantly low in order for the read head 16C to read previously-missed blocks on the track.

The embodiments of the invention in which an exclusive property or privilege is claimed are defined as follows:

1. Apparatus for reading information recorded on a storage medium in helical tracks, with each track comprising a plurality of blocks of data with each block having unique block-identifying information, said apparatus comprising:

a transport for selectively transporting the storage medium in forward and reverse directions of medium travel;

a rotatable drum having a portion of a peripheral surface thereof contiguous with the storage medium as the storage medium is transported therepast by the transport;

a reading head mounted on the drum for traversing original azimuthal paths across the storage medium and for reading blocks including the block-identifying information recorded along at least a portion of each of the original azimuthal paths;

a controller which uses the block-identifying information to determine whether any read errors occurred during the traversal of the original azimuthal paths, and which requires that the read head re-read portions of the storage medium where the error occurred by traversing modified azimuthal paths, the modified azimuthal paths being separated from one another by a distance less than the track pitch.

2. The apparatus of claim 1, wherein the re-read occurs as the medium travels in the reverse direction.

3. The apparatus of claim 1, wherein the controller requires rewinding of the medium and re-reading of the medium as the medium travels in the forward direction.

4. The apparatus of claim 1, wherein the original azimuthal paths and the modified azimuthal paths are essentially linear, with the modified azimuthal paths being essentially parallel to the original azimuthal paths.

5. The apparatus of claim 1, wherein the re-read speed is in a ratio in a range of 1:3 to 1:10 the nominal reading speed.

6. The apparatus of claim 1, further comprising memory means wherein the block-identifying information is stored, and wherein the control means examines the memory means to determine whether any blocks expected to be read during the traversal of the original azimuthal paths were not read.

7. Apparatus for reading information recorded on a storage medium in helical tracks, with each track comprising a plurality of blocks of data with each block having unique block-identifying information, said apparatus comprising:

a transport for selectively transporting the storage medium in forward and reverse directions of medium travel;

a rotatable drum having a portion of a peripheral surface thereof contiguous with the storage medium as the storage medium is transported therepast by the transport;

a reading head mounted on the drum for traversing original azimuthal paths across the storage medium and for reading blocks including the block-identifying information recorded along at least a portion of each of the original azimuthal paths;

a controller which uses the block-identifying information to determine whether any blocks expected to be read during the traversal of the original azimuthal paths were not read, and which generates a plurality of control signals in accordance with the determination for application to the transport, a first of the control signals causing the transport to transport the storage medium in the reverse direction of medium travel, a second of the control signals causing the transport to transport the storage medium at a re-read speed which is slower than a nominal reading speed, whereby, as the storage medium is transported at the re-read speed, the read head traverses modified azimuthal paths in an attempt to read a block which should have been previously read but was not previously read, the modified azimuthal paths being closer together in the direction of medium travel than the original azimuthal paths.

8. The apparatus of claim 7, wherein the re-read occurs as the medium travels in the reverse direction.

9. The apparatus of claim 7, wherein the controller requires rewinding of the medium and re-reading of the medium as the medium travels in the forward direction.

10. The apparatus of claim 7, wherein the original azimuthal paths and the modified azimuthal paths are essentially linear, with the modified azimuthal paths being essentially parallel to the original azimuthal paths.

11. The apparatus of claim 7, wherein the re-read speed is in a ratio in a range of 1:3 to 1:10 the nominal reading speed.

12. The apparatus of claim 7, further comprising memory means wherein the block-identifying information is stored, and wherein the control means examines the memory means to determine whether any blocks expected to be read during the traversal of the original azimuthal paths were not read.

13. A method for reading information recorded on a storage medium in helical tracks, with each track comprising a plurality of blocks of data with each block having unique block-identifying information, the method comprising:

transporting the storage medium in a forward direction of medium travel at a nominal reading speed past a rotatable drum, the rotatable drum having a portion of a peripheral surface thereof contiguous with the storage medium as the storage medium is transported therepast;

rotating the rotatable drum whereby reading means mounted on the drum traverses original azimuthal paths across the storage medium;

reading blocks including the block-identifying information recorded along at least a portion of each of the original azimuthal paths;

using the block-identifying information to determine whether any read errors occurred during the traversal of the original azimuthal paths; and, requiring, in response to the determination, that the read head re-read portions of the storage medium where the error occurred by traversing modified azimuthal paths, the modified azimuthal paths being separated from one another by a distance less than the track pitch.

14. The method of claim 13, wherein the re-read occurs as the medium travels in the reverse direction.

15. The method of claim 13, wherein the medium is rewound and the medium subsequently travels in the forward direction during the re-read.

16. The method of claim 13, wherein the original azimuthal paths and the modified azimuthal paths are essentially linear, with the modified azimuthal paths being essentially parallel to the original azimuthal paths.

17. The method of claim 13, wherein the re-read speed is in a ratio in a range of 1:3 to 1:10 the nominal reading speed.

18. A method for reading information recorded on a storage medium in helical tracks, with each track comprising a plurality of blocks of data with each block having unique block-identifying information, the method comprising:

transporting the storage medium in a forward direction of medium travel at a nominal reading speed past a rotatable drum, the rotatable drum having a portion of a peripheral surface thereof contiguous with the storage medium as the storage medium is transported therepast;

rotating the rotatable drum whereby reading means mounted on the drum traverses original azimuthal paths across the storage medium;

reading blocks including the block-identifying information recorded along at least a portion of each of the original azimuthal paths;

using the block-identifying information to determine whether any blocks expected to be read during the traversal of the original azimuthal paths were not read;

transporting the storage medium in a reverse direction of medium travel in response to the determination; then, transporting the storage medium in the forward direction at a re-read speed which is slower than the nominal reading speed, whereby, as the storage medium is transported at the re-read speed, the read head traverses modified azimuthal paths in an attempt to read a block which should have been previously read but was not previously read, the modified azimuthal paths being closer together in the direction of medium travel than the original azimuthal paths.

19. The method of claim 18, wherein the original azimuthal paths and the modified azimuthal paths are essentially linear, with the modified azimuthal paths being essentially parallel to the original azimuthal paths.

20. The method of claim 18, wherein the re-read speed is in a ratio in a range of 1:3 to 1:10 the nominal reading speed.

* * * * *